(12) United States Patent
Rankin et al.

(10) Patent No.: US 6,338,084 B1
(45) Date of Patent: Jan. 8, 2002

(54) METHOD FOR PROCESS-SPECIFIC EXCHANGE OF DATA BETWEEN MACHINES IN A NETWORK

(75) Inventors: Charles Vaughn Rankin; Donald H. Randall, Jr., both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,923

(22) Filed: Dec. 17, 1998

(51) Int. Cl.[7] .............................................. G06F 13/00
(52) U.S. Cl. ........................ 709/214; 709/213; 709/312; 709/329
(58) Field of Search ................................. 709/212, 213, 709/214, 215, 216, 217, 312, 328, 329

(56) References Cited

U.S. PATENT DOCUMENTS 5,765,165 A * 6/1998 Harper ........................ 707/104
5,926,633 A * 7/1999 Takagi et al. ................ 712/225
5,964,834 A * 10/1999 Crutcher ...................... 709/213

* cited by examiner

*Primary Examiner*—Viet D. Vu
(74) *Attorney, Agent, or Firm*—Sawyer Law Group LLP; Leslie VanLeeuwen

(57) ABSTRACT

The present invention provides a method for process-specific exchange of data between machines in a computer network. Each machine runs a plurality of processes. The method includes providing a plurality of clipboards for at least one machine in the computer network, where each clipboard of the plurality of clipboards corresponds to one of the processes running on the at least one machine; and storing data concerning a process of the plurality of processes onto its corresponding clipboard. Because the method of the present invention is process-based, machines may obtain data concerning certain processes on certain machines without the problem of the latest data on a process being overwritten by another process. Since the clipboards of the present invention may reside on a third party, if one or more of the machines in the network fail or are otherwise unavailable, the data on their clipboards are not lost.

7 Claims, 5 Drawing Sheets

Clipboard A/M1:
T/D Loop 100 of 1000

218

Clipboard B/M1:
T/D Loop 10 of 100

220

Clipboard A/M4:
T/D Loop 200 of 1000

230

Clipboard B/M4:
T/D Loop 20 of 100

METHOD FOR PROCESS-SPECIFIC EXCHANGE OF DATA BETWEEN MACHINES IN A NETWORK

FIELD OF THE INVENTION

The present invention relates to computer networks, and more particularly to the exchanging of data between different machines in a network.

BACKGROUND OF THE INVENTION

Computer networks contain several machines which often need to exchange data with each other. One conventional way to perform this exchange of data is to use a clipboard. A conventional clipboard is machine-specific memory to which one or more processes running on the machine may write data An example of a conventional protocol which uses a clipboard is the Network Dynamic Data Exchange (Network DDE) protocol. FIG. 1 illustrates a conventional network which uses the Network DDE protocol. The network 100 includes a plurality of machines 102–108. Each machine runs processes, or programs, such as Processes A–D 110–116. Each machine also has its corresponding clipboard 118–124. These clipboards 118–124 are global in nature, i.e., all processes running on the specific machine write data to the same clipboard which resides on the specific machine. In the Network DDE protocol, the machines in the network 100 may access each other's clipboards. For example, machine 102 (Machine 1) has its own clipboard 118. The processes A–D 110 running on machine 102 each write data to the global clipboard 118. As data is written onto the clipboard 118, older data already residing on the clipboard is overwritten. Thus, the clipboard 118 contains the latest data written to it. For example, process A on machine 102 first write data into the clipboard 118. Later, process B writes data into the clipboard 118. The data from process A is overwritten by the data from process B. The data concerning process A is thus no longer available. However, a user may wish to obtain the latest data concerning process A. With the conventional clipboards, this is not possible. The conventional clipboards also present a problem if any of the machines fail or is otherwise unavailable. When a machine fails, the data on its clipboard is lost.

Accordingly, what is needed is a method for a process-specific exchange of data between machines in a computer network. The method should be able to avoid the problem of losing data concerning processes on a particular machine if that machine fails. The present invention addresses such a need.

SUMMARY OF THE INVENTION

The present invention provides a method for process-specific exchange of data between machines in a computer network. Each machine runs a plurality of processes. The method includes providing a plurality of clipboards for a first machine in the computer network, where each clipboard of the plurality of clipboards corresponds to one of the processes running on the first machine; and storing data concerning a process of the plurality of processes onto its corresponding clipboard. Because the method of the present invention is process-based, machines may obtain data concerning certain processes on certain machines without the problem of the latest data on a process being overwritten by another process. Since the clipboards of the present invention may reside on a third party, if one or more of the machines in the network fail or are otherwise unavailable, the data on their clipboards are not lost.

BRIEF DESCRIPTION OF THE FIGURES

FIG. 3 illustrates the contents of example clipboards in accordance with the present invention.

DETAILED DESCRIPTION

The present invention provides a method for a process-specific exchange of data between machines in a computer network The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to the FIGS. 2A through 5 and the discussion below.

Figure 1:
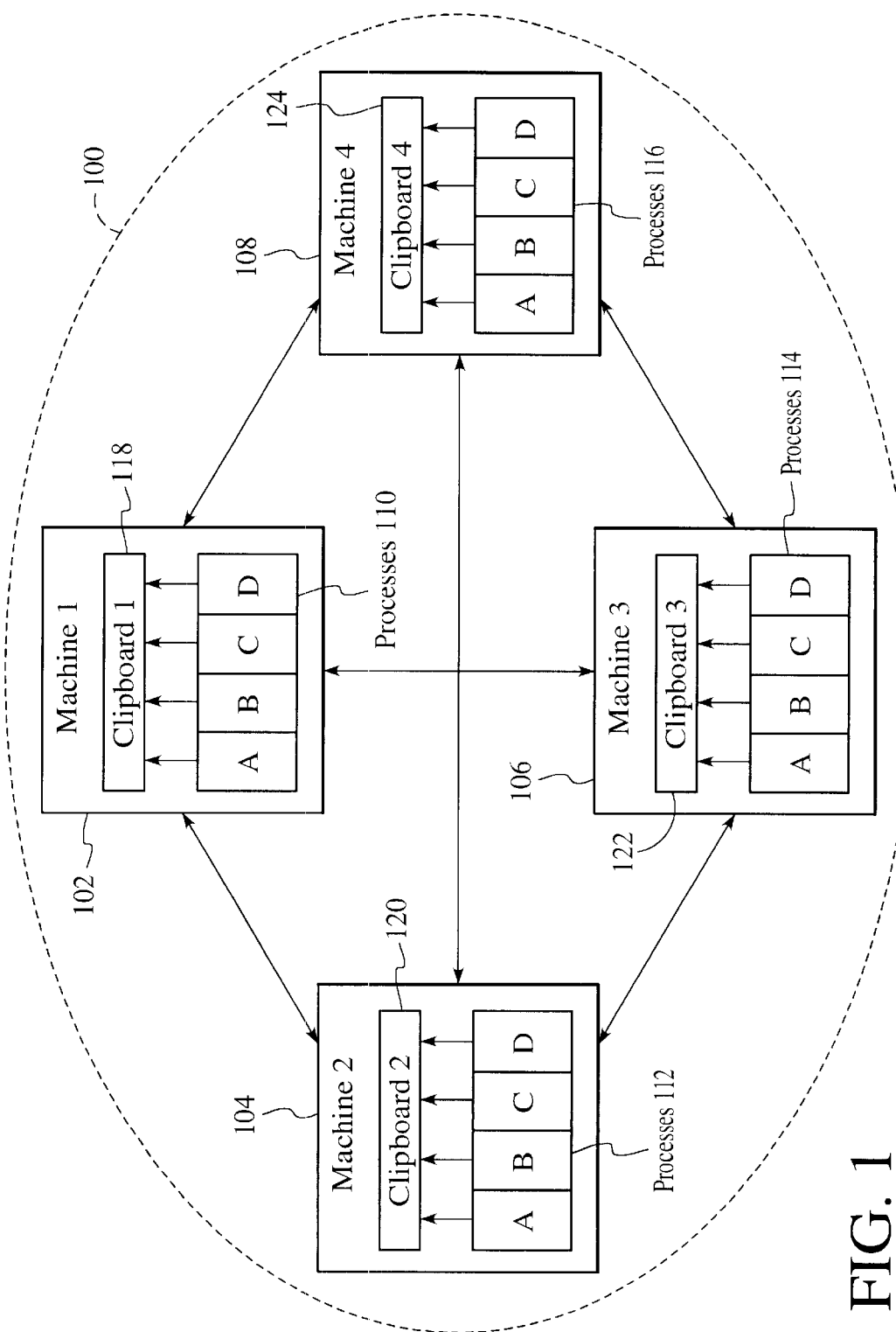
FIG. 1 illustrates a conventional network with a conventional protocol using a network clipboard.
Figure 2A:
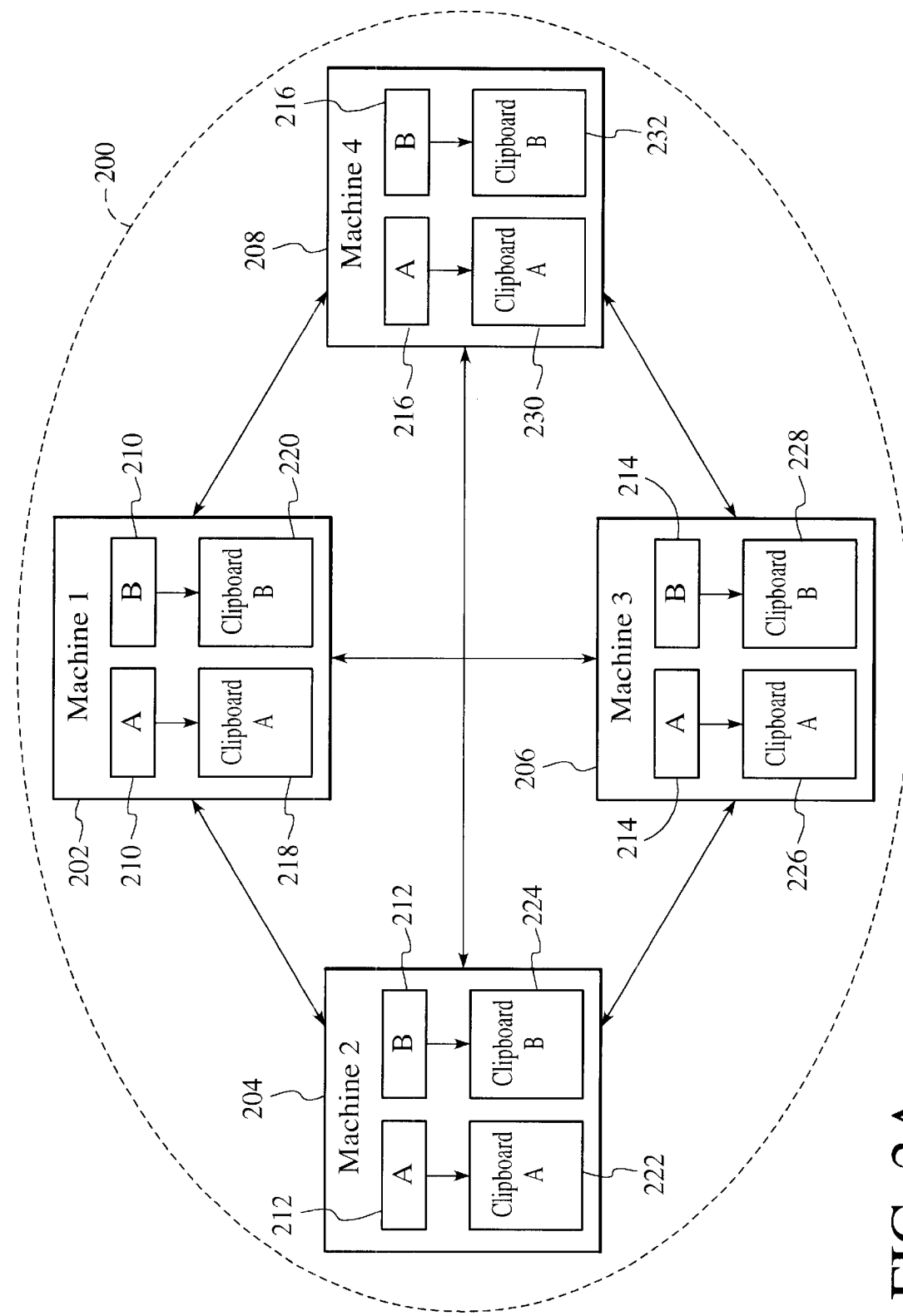
FIG. 2A illustrates a first preferred embodiment of a network using network clipboards in accordance with the present invention.

FIG. 2A illustrates a first preferred embodiment of a network using the method for data exchange between machines in accordance with the present invention. The network 200 includes a plurality of machines 202–208, each running processes 210–216. Processes, for the purpose of this disclosure, refers to programs. Each machine has its own plurality of clipboards. Each clipboard on a particular machine corresponds to one of the processes running on the machine. Each process writes data to its own corresponding clipboard. For example, machine 202 (Machine 1) runs processes A and B 210. Clipboard 218 corresponds to process A running on machine 202, so process A writes its data onto clipboard 218; clipboard 220 corresponds to process B running on machine 202, so process B writes its data onto clipboard 220. In the same manner, machine 204 (Machine 2) runs processes A and B 212. Clipboard 222 corresponds to process A running on machine 204, so process A writes its data onto clipboard 222; clipboard 224 corresponds to process B running on machine 204, so process B writes its data onto clipboard 224. The same is true for machines 206 and 208. Thus, unlike conventional clipboards which are global in nature, the clipboards of the present invention are process-specific as well as machine-specific.

Figure 2B:
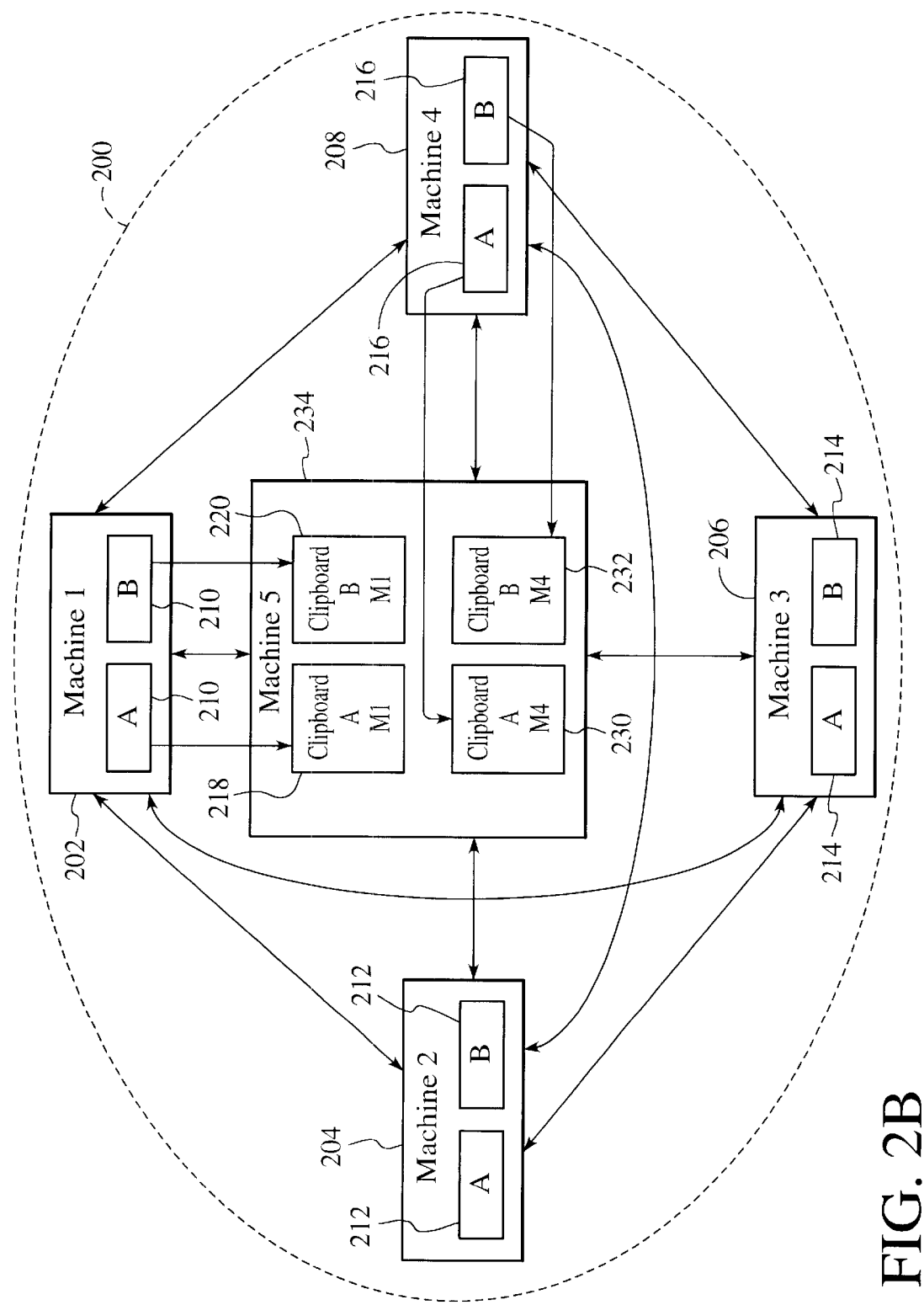
FIG. 2B illustrates a second preferred embodiment of a network using network clipboards in accordance with the present invention.

FIG. 2B illustrates a second preferred embodiment of a network using the method for data exchange between machines in accordance with the present invention. In this embodiment, the clipboards 218–232 are still process-specific and machine-specific, as in the first preferred embodiment, however the clipboards reside on a third party, such as machine 234. For example, process A running on machine 202 writes data to its corresponding clipboard 218 which resides on machine 234; process B running on machine 202 writes data to its corresponding clipboard 220 which also resides on machine 234. The same is true for the processes running on machines 204–208. Since the clipboards reside on a third party, if one or more of the machines 202–208 fails or is otherwise unavailable, the data concerning the processes 210–216 running on these machines 202–208 are not lost.

Although the present invention is described with the location of the clipboards configured as illustrated in the first and second preferred embodiments, one of ordinary skill in the art will understand that other configurations of the clipboard locations may be used without departing from the spirit and scope of the present invention.

FIG. 3 illustrates sample contents of example clipboards in the first and second preferred embodiments of the present invention. As described above, clipboard 218 contains data from process A running on machine 202. In the preferred embodiments, each piece of data is tagged with a time/date stamp. Thus, clipboard 218 contains data stating that process A on machine 202 was executing loop 100 of 1000 at a particular time/date (T/D). Clipboard 220 contains data stating that process B on machine 202 was executing loop 10 of 100 at T/D. Clipboard 230 contains data stating that process A on machine 208 was executing loop 200 of 1000 at T/D. Clipboard 232 contains data stating that process B on machine 208 was executing loop 20 of 100 at T/D. When process A on machine 202 writes the next piece of data onto its clipboard 218, the old data is overwritten. The same is true for the other processes 210–216 writing data to their respective clipboards 220–224 as well.

In the preferred embodiment, text strings are stored to and retrieved from the clipboards 218–232, however, one of ordinary skill in the art will understand that other data formats may be used without departing from the spirit and scope of the present invention. For example, the use of a binary format with a tag may be used where the type tag informs the receiving machine about the nature of the data.

Figure 4:
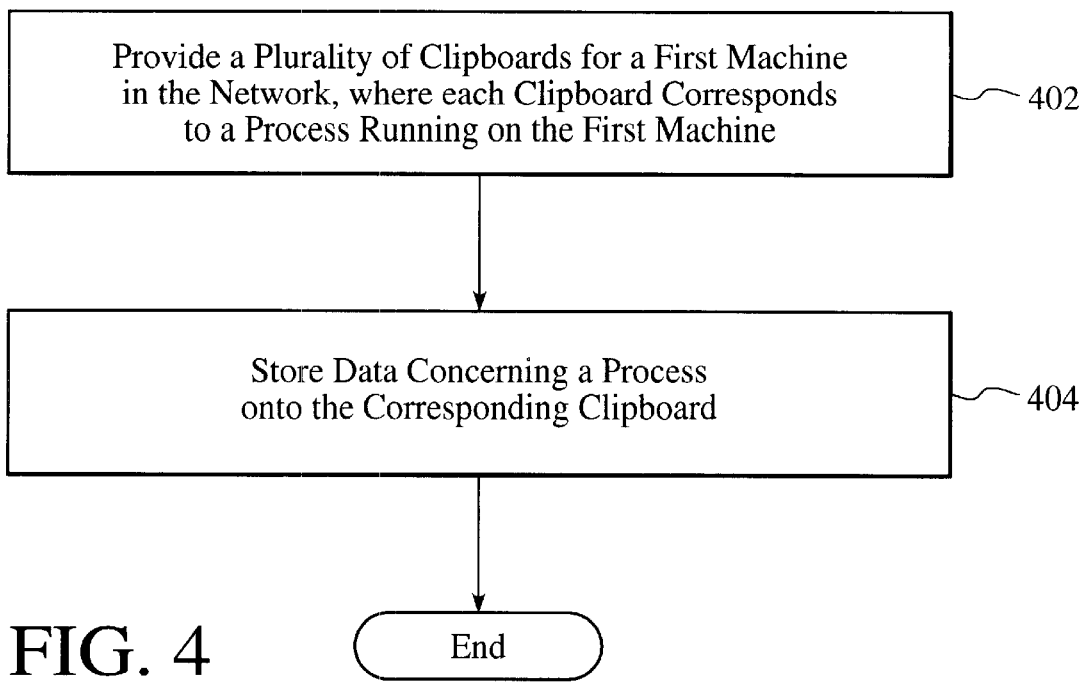
FIG. 4 is a flow chart illustrating a preferred embodiment of the storing of data onto clipboards in accordance with the present invention.

FIG. 4 is a flow chart illustrating the preferred embodiment of the storing of data by a machine in the network onto a clipboard. First, a plurality of clipboards are provided for at least one of the machines where each clipboard correspond to a process that is running on the at least one machine, via step 402. Then, the at least one machine stores data concerning a process onto the corresponding clipboard, via step 404. For example, machine 202 is provided with clipboards 218 and 220 which correspond to processes A and B 210 respectively, via step 402. Machine 202 may then store data concerning process A onto the corresponding clipboard 218 and concerning process B onto the corresponding clipboard 220, via step 404.

Figure 5:
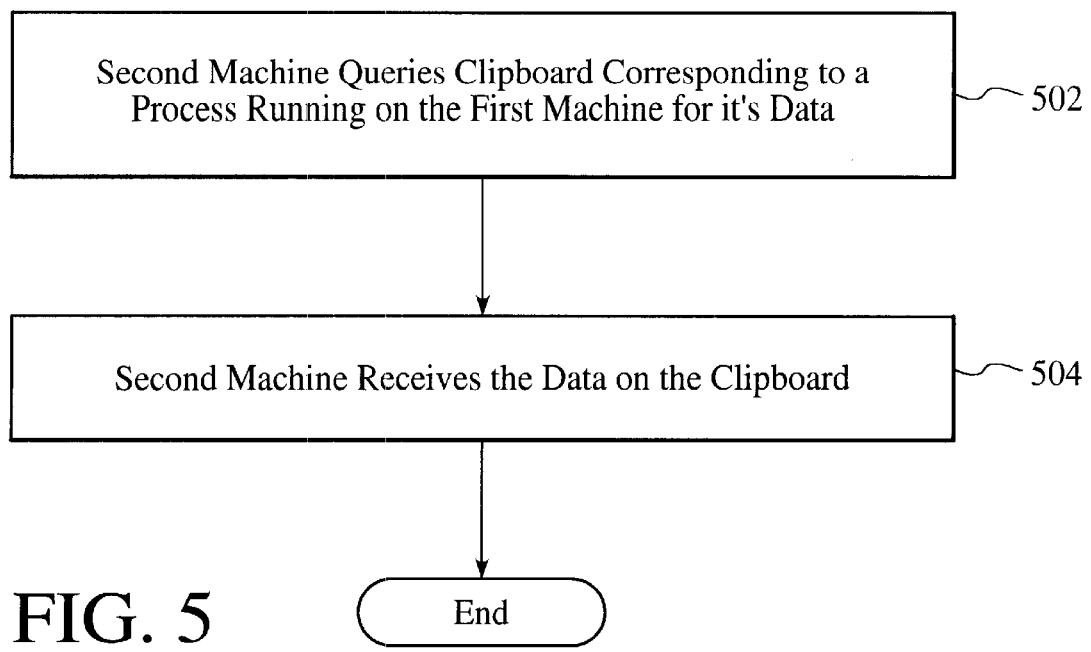
FIG. 5 is a flow chart illustrating a preferred embodiment of the retrieval of data from clipboards in accordance with the present invention.

FIG. 5 is a flow chart illustrating the preferred embodiment of the retrieval of information by a machine in the network from a clipboard. First, assume another machine in the network is interested in a particular process running on the at least one machine in the network. The other machine queries the clipboard which corresponds to the process running on the at least one machine for its data, via step 502. The clipboard answers the query, and the other machine receives the data on the clipboard, via step 504. The at least one machine and the other machine may be the same machine. For example, assume machine 206 wishes to obtain information concerning process B running on machine 202. First, machine 206 queries the clipboard 220 which corresponds to process B running on machine 202 for its data, via step 502. Clipboard 220 answers the query, and machine 206 receives the data on the clipboard 220, via step 504. For another example, assume machine 202 wishes to obtain information concerning process B running on itself Machine 202 queries the clipboard 220 which corresponds to process B running on itself for its data, via step 502. Clipboard 220 answers the query, and machine 202 receives the data on the clipboard 220, via step 504.

The processes illustrated in FIGS. 4 and 5 apply to both the first and second preferred embodiments of the networks using the method for data exchange between machines in accordance with the present invention. In both preferred embodiments, the locations of the clipboards are predetermined and are known by each machine in the network.

A method for a process-specific exchange of data between machines in a computer network has been disclosed. Because the method of the present invention is process-based, machines may obtain data concerning certain processes on certain machines without the problem of the latest data on a process being overwritten by another process. Since the clipboards of the present invention may reside on a third party, if one or more of the machines in the network fail or are otherwise unavailable, the data on their clipboards are not lost.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for process-specific exchange of data between a plurality of machines in a computer network, each machine running at least a first and a second process, comprising the steps of:

(a) providing at least a first and a second clipboard for at least one machine, wherein the first clipboard corresponds to the first process running on the at least one machine and the second clipboard corresponds to the second process running on the at least one machine;

(b) storing data concerning the first process onto the first clipboard by the at least one machine;

(c) querying the first clipboard by another machine for the data on the first clipboard;

(d) receiving the data on the first clipboard by the other machine;

(e) storing data concerning the second process onto the second clipboard by the at least one machine;

(f) querying the second clipboard by another machine for the data on the second clipboard; and (g) receiving the data on the second clipboard by the other machine.

2. The method of claim 1, wherein the first clipboard for the at least one machine may reside on a different machine in the network.

3. A system for process-specific exchange of data, comprising:

a plurality of machines coupled to each other, wherein each of the plurality of machines runs at least a first and a second process; and at least a first and a second clipboard for each of the plurality of machines, wherein the first clipboard corresponds to the first process running on at least one machine of the plurality of machines and the second clipboard corresponds to the second process running on the at least one machine, wherein the first clipboard comprises:
means for the at least one machine to store data concerning the first process onto the first clipboard,
means for querying the first clipboard by another machine for the data on the first clipboard, and
means for receiving the data on the first clipboard by the other machine, wherein the second clipboard comprises:
means for the at least one machine to store data concerning the second process onto the second clipboard,
means for querying the second clipboard by another machine for the data on the second clipboard, and
means for receiving the data on the second clipboard by the other machine.

4. A computer readable medium with computer instructions for process-specific exchange of data between machines in a computer network, each machine running at least a first and a second process, the computer instructions for:

(a) providing at least a first and a second clipboard for at least one machine, wherein the first clipboard corresponds to the first process running on the at least one machine and the second clipboard corresponds to the second process running on the at least one machine;

(b) storing data concerning the first process onto the first clipboard;

(c) querying the first clipboard by another machine for the data on the first clipboard;

(d) receiving the data on the first clipboard by the other machine;

(e) storing data concerning the second process onto the second clipboard by the at least one machine;

(f) querying the second clipboard by another machine for the data on the second clipboard; and (g) receiving the data on the second clipboard by the other machine.

5. The method of claim 1, wherein the second clipboard for the at least one machine may reside on a different machine in the network.

6. The system of claim 3, wherein the second clipboard for a machine may reside either on the machine or on a different machine in the network.

7. The system of claim 3, wherein the first clipboard for a machine may reside either on the machine or on a different machine in the network.

* * * * *